United States Patent
Watanabe et al.

(10) Patent No.: US 7,630,093 B2
(45) Date of Patent: *Dec. 8, 2009

(54) IMAGE FORMING SYSTEM AND IMAGE FORMING METHOD

(75) Inventors: Ryoji Watanabe, Kanagawa (JP); Akihiko Takada, Kanagawa (JP); Masayoshi Sakakibara, Kanagawa (JP); Hajime Kishimoto, Kanagawa (JP); Yasuo Horino, Tokyo (JP); Toshiyuki Yano, Kanagawa (JP); Yasuhiro Matsuo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1035 days.

This patent is subject to a terminal disclaimer.

(21) Appl. No.: 10/647,207

(22) Filed: Aug. 26, 2003

(65) Prior Publication Data

US 2004/0046985 A1 Mar. 11, 2004

(30) Foreign Application Priority Data

Aug. 28, 2002 (JP) .............................. 2002-248740

(51) Int. Cl.
*G06F 3/12* (2006.01)
*G06K 15/00* (2006.01)
(52) U.S. Cl. .................................... 358/1.15; 358/1.16
(58) Field of Classification Search ................ 358/1.2, 358/1.5, 1.1, 1.6, 1.9, 1.12–1.18
See application file for complete search history.

(56) References Cited

U.S. PATENT DOCUMENTS

| | | | |
|---|---|---|---|
| 6,585,154 B1* | 7/2003 | Ostrover et al. ............. 235/375 |
| 6,827,279 B2* | 12/2004 | Teraura ...................... 235/492 |
| 7,048,194 B2* | 5/2006 | Minami et al. .............. 235/492 |
| 7,385,723 B2* | 6/2008 | Kawano et al. ............ 358/1.16 |
| 7,474,427 B2* | 1/2009 | Watanabe et al. .......... 358/1.15 |
| 2002/0051161 A1* | 5/2002 | Kanazawa et al. ......... 358/1.12 |
| 2002/0170973 A1* | 11/2002 | Teraura ...................... 235/492 |
| 2003/0137680 A1* | 7/2003 | Maruoka .................... 358/1.13 |
| 2004/0021708 A1* | 2/2004 | Lay et al. ......................... 347/5 |
| 2005/0141003 A1* | 6/2005 | Yamamoto et al. ......... 358/1.12 |
| 2005/0141004 A1* | 6/2005 | Kiwada ....................... 358/1.12 |
| 2005/0141009 A1* | 6/2005 | Kiwada ....................... 358/1.14 |

FOREIGN PATENT DOCUMENTS

JP A 9-116739 5/1997

(Continued)

OTHER PUBLICATIONS http://pcweb.mycom.co.jp/news/2001/07/05/22.html.

*Primary Examiner*—Mark K Zimmerman
*Assistant Examiner*—Mesfin Getaneh
(74) *Attorney, Agent, or Firm*—Oliff & Berridge, PLC

(57) ABSTRACT

An UI section receives a printing parameter set by a user. A data reading section reads a printing parameter from an original paper. An image reading section reads an image from the original paper. When an IC chip has been attached to the original paper, a parameter selecting section selects a printing parameter thereof, whereas in other cases, the parameter selecting section selects a printing parameter, which is set by the user. An image processing section and a printing control section execute an image processing operation and a printing operation in accordance with the selected printing parameter.

8 Claims, 12 Drawing Sheets

FOREIGN PATENT DOCUMENTS

| | | |
|---|---|---|
| JP | A 11-003390 | 1/1999 |
| JP | A 11-187247 | 7/1999 |
| JP | A 2000-285203 | 10/2000 |
| JP | A 2001-134672 | 5/2001 |
| JP | A 2001-148000 | 5/2001 |
| JP | A 2001-229199 | 8/2001 |
| JP | A 2001-260580 | 9/2001 |
| JP | A 2001-283011 | 10/2001 |
| JP | A 2002-190911 | 7/2002 |

* cited by examiner

FIG. 8

PRINTING PARAMETER (HISTORY)

ERROR DETECTION/
CORRECTION CODES

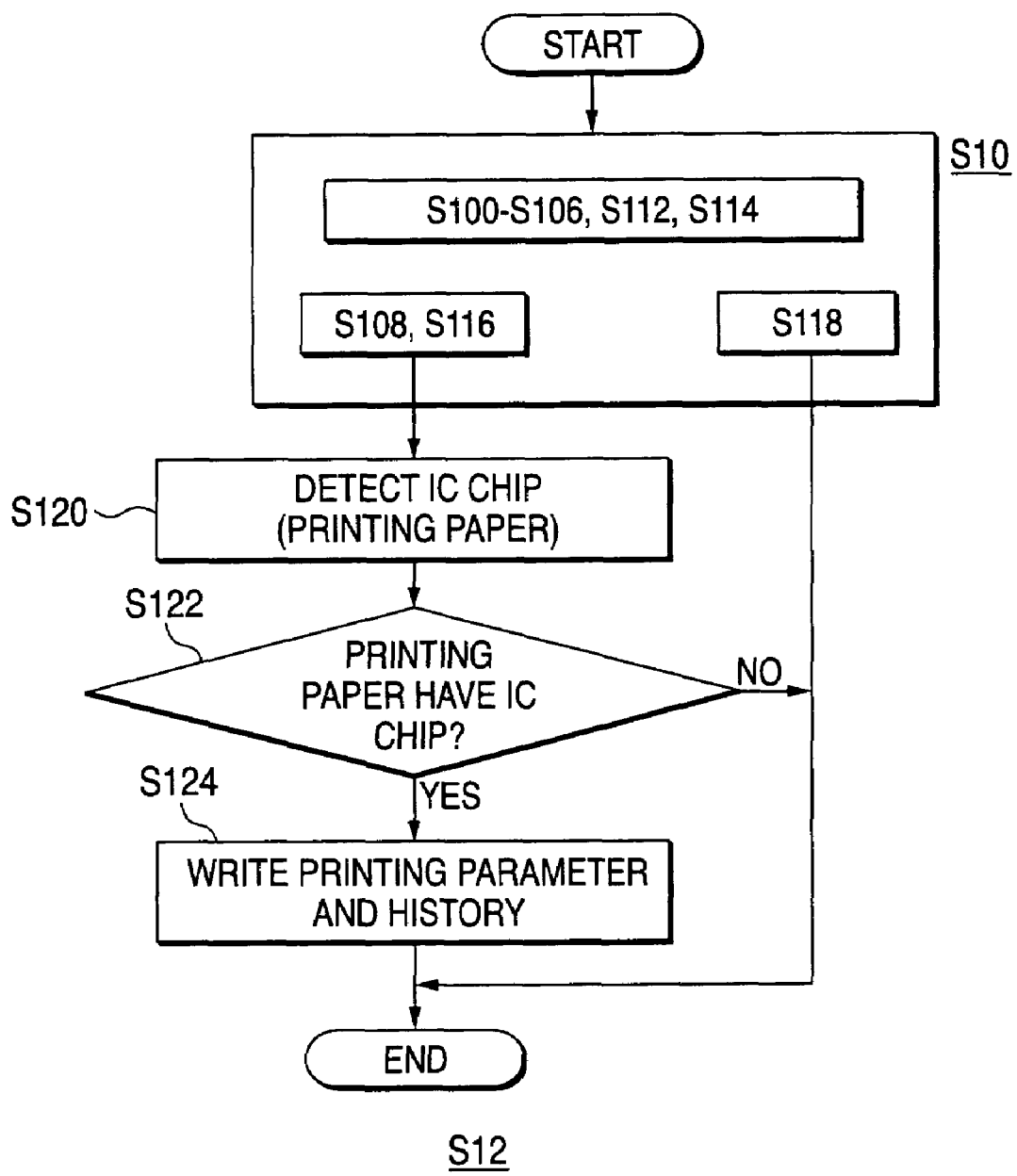

IMAGE FORMING SYSTEM AND IMAGE FORMING METHOD

The present disclosure relates to the subject matter contained in Japanese Patent Application No. 2002-248740 filed on Aug. 28, 2002, which is incorporated herein by reference in its entirety.

BACKGROUND OF THE INVENTION

1. Field of the Invention

The present invention is related to an image forming system and an image forming method, which can set a parameter required to form an image using a non-contact memory attached to an original paper and/or a printing paper.

2. Description of the Related Art

A compact semiconductor chip (for example, µ-chip by HITACHI, LTD.) from which an external unit can read stored data in a non-contact manner has been known.

Also, JP-A-2001-229199, JP-A-2000-285203, JP-A-2001-134672, JP-A-2001-283011, JP-A-2001-148000, and JP-A-2001-260580 disclose applications of the compact semiconductor chip.

SUMMARY OF THE INVENTION

The present invention has been made from the viewpoint of the technical background, and therefore, has an object to provide an image forming system and an image forming method, to which the semiconductor chip which can read stored data in a non-contact manner is applied. The image forming system and the image forming method store setting information of an image formation into an original and can form an image using the stored setting information of the image formation.

Also, another object of the invention is to provide an image forming system and an image forming method, in which while setting information and a history of image formation are also stored into a printing paper, an image formed on the printing paper can be furthermore utilized in the image forming operation.

[Image Forming System]

To achieve the above-described objects, according to a first aspect of the invention, an image forming system includes an image display member on which an image is displayed, and an image forming apparatus. The image display member includes a first parameter storage unit stores a first parameter indicating a way to form the displayed image and a formation history of the displayed image and outputs the stored first parameter to an external. The image forming apparatus includes an image reading unit for reading the displayed image, a parameter reading unit for reading the output first parameter, and an image forming unit for forming the read image on the basis of the read first parameter on a recording medium.

Preferably, the recording medium includes a second parameter storage unit for storing the first parameter written from the external and outputting the stored first parameter to the external. The image forming apparatus includes a parameter writing unit for writing one of the read first parameter and a second parameter containing a history updated in response to the image formation on the recording medium into the second parameter storage unit.

According to a second aspect of the invention, an image forming apparatus includes an image reading unit for reading an image displayed on an image display member, a parameter reading unit for reading a first parameter indicating at least one of a way to form the displayed image and a formation history of the displayed image from the image display member, and an image forming unit for forming the read image on the basis of the read first parameter on a recording medium.

Preferably, the image forming apparatus further includes a parameter writing unit for writing one of the read first parameter and a second parameter containing a history updated in response to the image formation on the recording medium into a storage unit of the recording medium.

Preferably, the first parameter includes information indicating a mode for forming the displayed image on the recording medium, a size of the formed image, and number of the image formation.

Preferably, the history contained in the second parameter includes at least a size change of the image formed on the recording medium.

According to a third aspect of the invention, a method for forming an image, which is displayed on an image display member, on a recording medium, the method includes outputting a first parameter indicating at least one of a way to form the displayed image and a formation history of the displayed image to an external by the image display member, reading the displayed image from the image display member, reading the output first parameter, and forming the read image on the basis of the read first parameter on a recording medium.

Preferably, the method further includes storing a parameter written from the external and outputting the stored parameter to the external by the recording medium, and writing one of the read first parameter and a second parameter containing a history updated in response to the image formation on the recording medium into the recording medium.

According to a fourth aspect of the invention, a program makes a computer execute a process including outputting a first parameter indicating at least one of a way to form an image, which is displayed on a image display member, and a formation history of the displayed image to an external by the image display member, reading the displayed image from the image display member, reading the output first parameter, and forming the read image on the basis of the read first parameter on a recording medium.

Preferably, the process further includes storing a parameter written from the external and outputting the stored parameter to the external by the recording medium, and writing one of the read first parameter and a second parameter containing a history updated in response to the image formation on the recording medium into the recording medium.

BRIEF DESCRIPTION OF THE DRAWINGS

FIG. 8 is a diagram for exemplifying data stored in the IC chip.

FIG. 13 is a diagram for indicating a printing paper to which an IC chip has been attached.

FIG. 14 is a flow chart for representing overall operation (S12) of a composite copying machine (third printing program; FIG. 12) according to the second embodiment.

DETAILED DESCRIPTION OF THE PREFERRED EMBODIMENTS

Normally, in copying machines, users who try to make copies, not writers who have written original papers, will set printing methods, for instance, will set whether color copies or black/white copies are made; will set how many copies are produced; will set whether original papers are copied in an equi-magnification mode, an enlarge-magnification mode, or a compression-magnification mode.

However, when color original papers are copied in the black/white copying mode, there are some possibilities that intentions of writers who have written these color original papers cannot be reflected thereon.

Also, users who have not so many experiences may possibly set erroneous total numbers of copies.

The invention has been made by considering such a difficult aspect, and therefore can make up such a device that while writers of original images have previously stored printing parameters for designating copies (image formations) into original papers, these original papers may be copied by reflecting thereon intentions of these writers.

FIG. 1 is a diagram for showing examples of N-up printings (will be explained later). FIG. 1A indicates 16 sheets of original papers "A" to "P". FIG. 1B represents a printing result of a 2-up printing in which 16 sheets of the original papers "A" to "P" are printed on 8 sheets of printing papers every two sheets of the original papers "A" to "P". Also, FIG. 1C shows a printing result of a 4-up printing which is obtained by furthermore performing the 2-up printing with respect to the printing result indicated in FIG. 1B. Further, FIG. 1D shows a printing result of an 8-up printing which is obtained by furthermore performing the 2-up printing with respect to the printing result indicated in FIG. 1C.

In order to save printing papers at a time of printing, there are some cases that, as illustrated in FIG. 1A to FIG. 1D, plural (N) sheets of original papers are printed together on a single sheet of printing paper (namely, N-up printing).

Figure 1A:
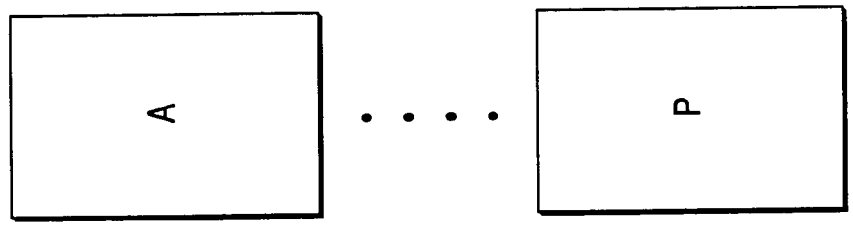
FIG. 1A indicates 16 sheets of original papers "A" to "P"
Figure 1B:
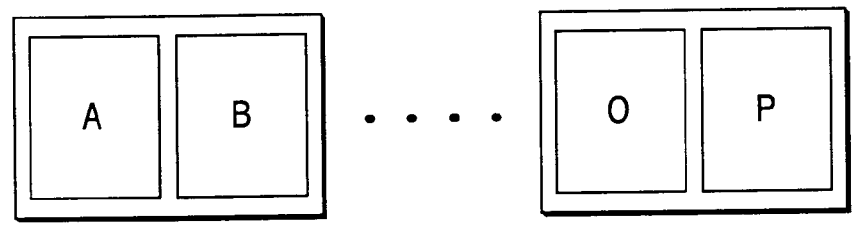
FIG. 1B represents a printing result of a 2-up printing operation in which 16 sheets of these original papers "A" to "P" are printed on 8 sheets of printing papers every two sheets of these original papers "A" to "P"
Figure 1C:
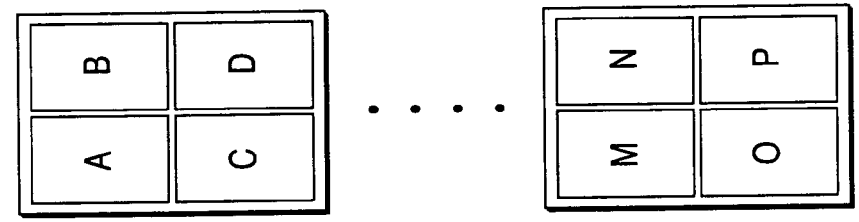
FIG. 1C shows a printing result of a 4-up printing operation which is obtained by furthermore performing a 2-up printing operation with respect to the printing result indicated in FIG. 1B; and, FIG. 1D shows a printing result of an 8-up printing operation which is obtained by furthermore performing a 2-up printing-operation with respect to the printing result indicated in FIG. 1C.
Figure 1D:
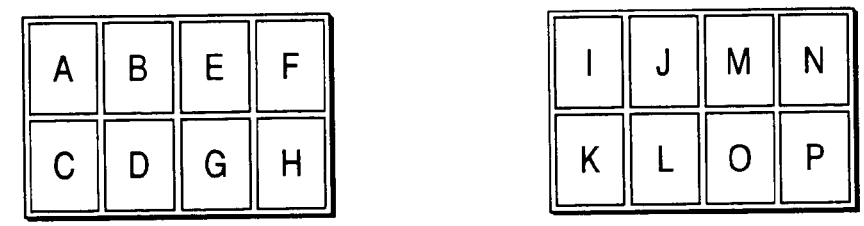
FIG. 1 is a diagram for showing a mode of an N-up printing operation in an exemplification manner.

In this case, for example, as indicated in FIG. 1C, when an original paper has already been printed in the 4-up printing and this original paper is furthermore tried to be printed in the 2-up printing mode, there are some possibilities that images of printed articles may become excessively small (as indicated in FIG. 1D), may become destroyed, and therefore, can be hardly read/discriminated.

In such a case, if the following information has already been stored so as to prohibit another N-up printing, then user friendly conditions may be established. That is, while information that the original paper has already been printed in the 4-up printing (see FIG. 1C) is stored in the original paper (printing paper), the execution of another N-up printing (namely, 8-up printing operation shown in FIG. 1D) may be prohibited, resulting in such user friendly conditions.

The invention has been made by also considering this point. Therefore, according to the invention, a history of image printing operations (image formations) can be read from an original to obtain superior readable/discriminatable printing results.

First Embodiment

A first embodiment of the invention will now be explained.

In an image forming method represented as the first embodiment, a printing parameter for designating a printing method is read from an IC chip, which has been attached to an original paper and then, a printing operation (namely, image formation) is carried out based on this printing parameter.

[Composite Copying Machine 1]

Figure 2:
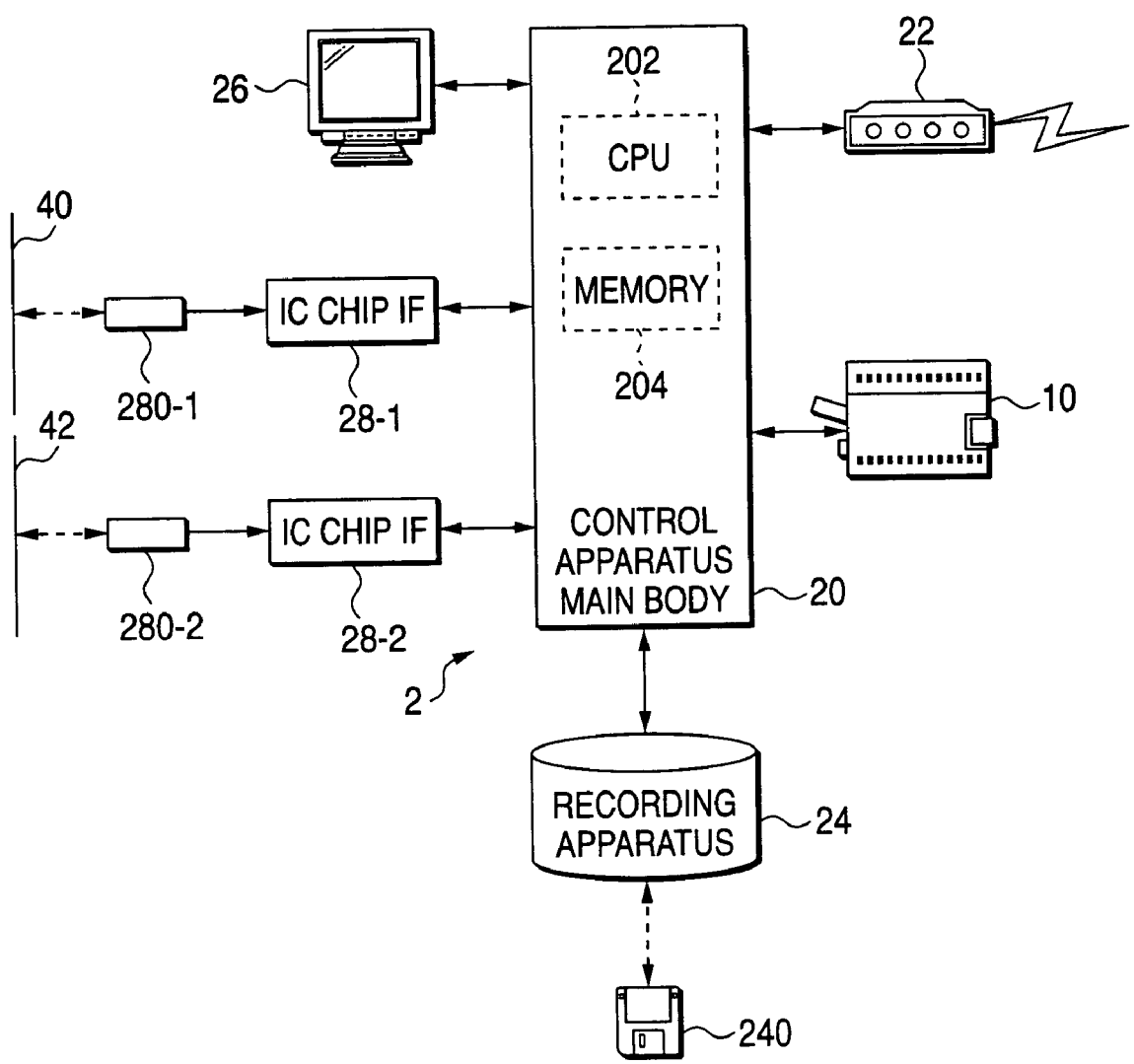
FIG. 2 is a diagram for representing a hardware structure of a composite copying machine to which an image forming method according to the present invention is applied, i.e., for mainly exemplifying a control apparatus thereof.

FIG. 2 is a diagram for showing a hardware structure of a composite copying machine 1 to which an image forming method according to the invention is applied, while a control apparatus 2 of this composite copying machine 1 is mainly illustrated.

As shown in FIG. 2, the composite copying machine 1 includes the control apparatus 2 and an apparatus main body 10.

The control apparatus 2 includes a control apparatus main body 20, a communication apparatus 22, a recording apparatus 24 such as an HDD/CD apparatus, a user interface apparatus (UI apparatus) 26, and first and second IC chip interfaces (IC chip IF) 28-1 and 28-2. The control apparatus main body 20 contains a CPU 202, a memory 204, and the like. The user interface apparatus 26 contains either an LCD display apparatus or a CRT display apparatus, and a keyboard/touch panel, and so on. The first and second IC chip interfaces 28-1 and 28-2 contain a first antenna 280-1 and a second antenna 280-2, respectively.

[Apparatus Main Body 10]

Figure 3:
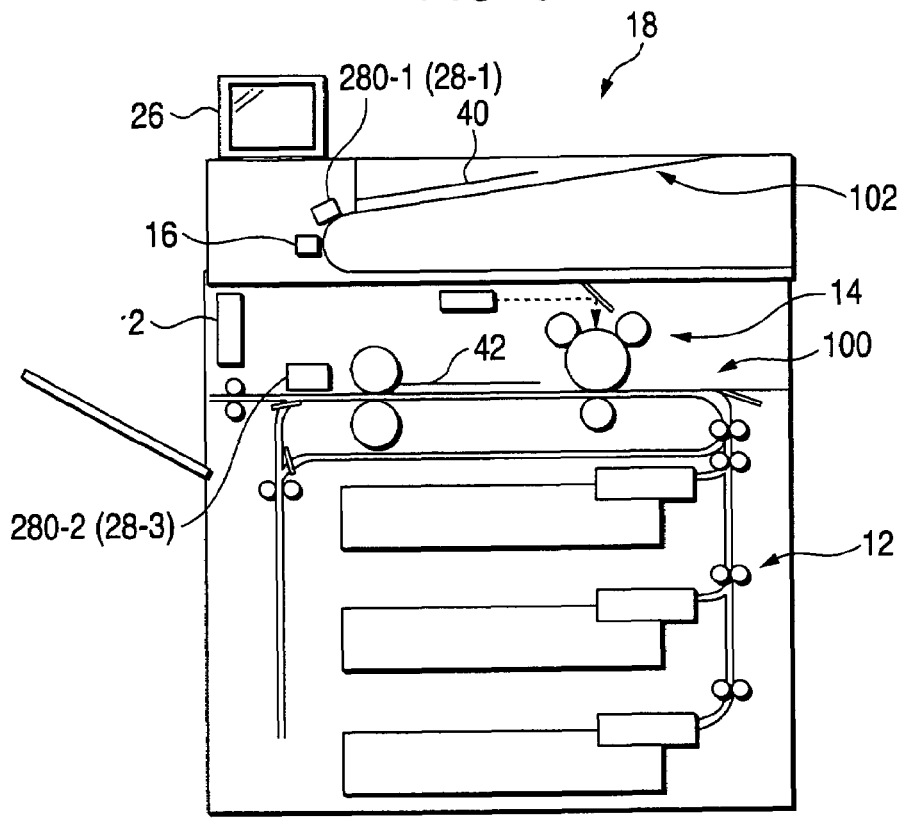
FIG. 3 is a diagram for exemplifying a hardware construction of an apparatus main body indicated in FIG. 2.

FIG. 3 is a diagram for showing an example of a hardware structure of the apparatus main body 10 shown in FIG. 2.

As shown in FIG. 3, the apparatus main body 10 includes a paper tray section 12, a print engine 14, a scanner 16, an original feeding apparatus 18, and the like. The print engine 14 prints (forms) images on printing papers 42, which are fed from the paper tray section 12, by way of the xerography technique. The scanner 16 reads an image of an original paper 40. The original feeding apparatus 18 feeds the original paper 40.

In the apparatus main body 10, both the first IC chip IF 28-1 and the first antenna thereof 280-1 are arranged in the vicinity of an original feeding path 102 of the original feeding apparatus 18, through which the original paper 40 is transported.

Also, both the second IC chip IF 28-2 and the second antenna thereof 280-2 are arranged in the vicinity of a printing paper transport path 100 through which the printing papers 42 are transported. It should be understood that both the second IC chip IF 28-2 and the second antenna 280-2 are required in a second embodiment of the invention as to the composite copying machine 1.

Also, the UI (user interface) apparatus 26 is arranged at an upper portion of the apparatus main body 10.

In other words, the composite copying machine 1 may be realized by employing such a hardware structure that both the first and second IC chip IF 28-1, 28-2 and the first and second antennas 280-1, 280-2 are additionally provided in a general-purpose composite copying machine having a function of reading and printing an image of the original paper 40 fed from the original feeding apparatus 18 and another function of transmitting this image in a FAX (facsimile) mode.

It should be noted that as represented in FIG. 3, the control apparatus 2 (see FIG. 2) is actually stored inside the apparatus main body 10.

[Original Paper 40]

Figure 4:
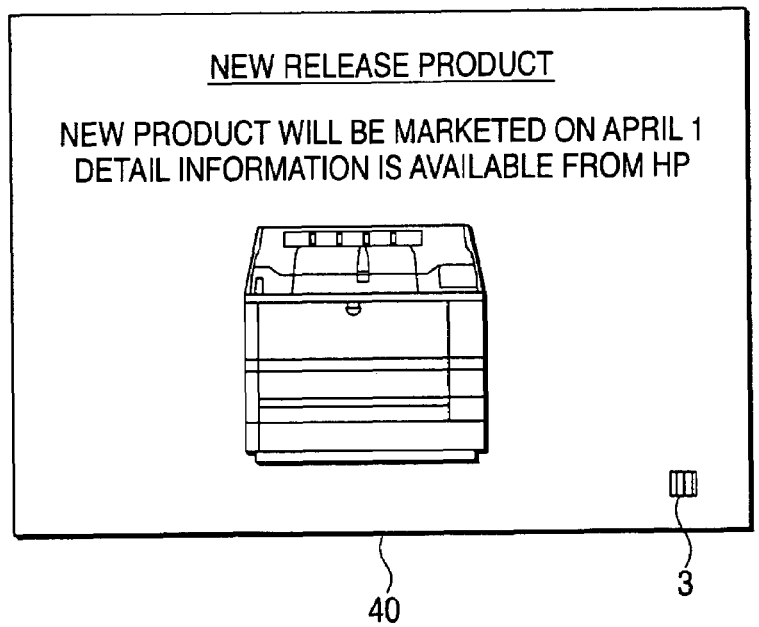
FIG. 4 is a diagram for exemplifying an original paper indicated in FIG. 2 and FIG. 3.

FIG. 4 is a diagram for showing an example of the original paper 40 shown in FIG. 2 and FIG. 3.

As shown in FIG. 4, either a color image or a black/white image such as a text and an image, which are designed to be read, or image-formed by the composite copying machine 1, is displayed (printed) on the original paper 40. A first IC chip 3 is applied to this original paper 40 by way of either a pasting method or an embedding method.

[IC Chip 3/IC Chip IF 28]

Figure 5:
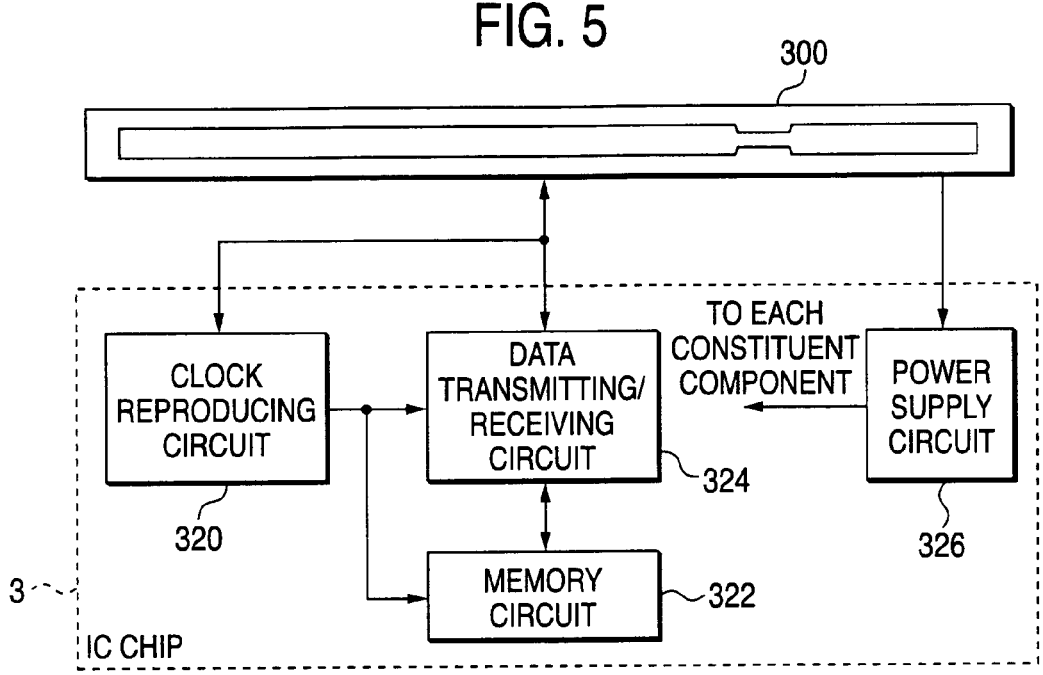
FIG. 5 is a diagram for showing a structure of a first IC chip indicated in FIG. 4.

FIG. 5 is a diagram for schematically showing a structure of the first IC chip 3 shown in FIG. 4.

Figure 6:
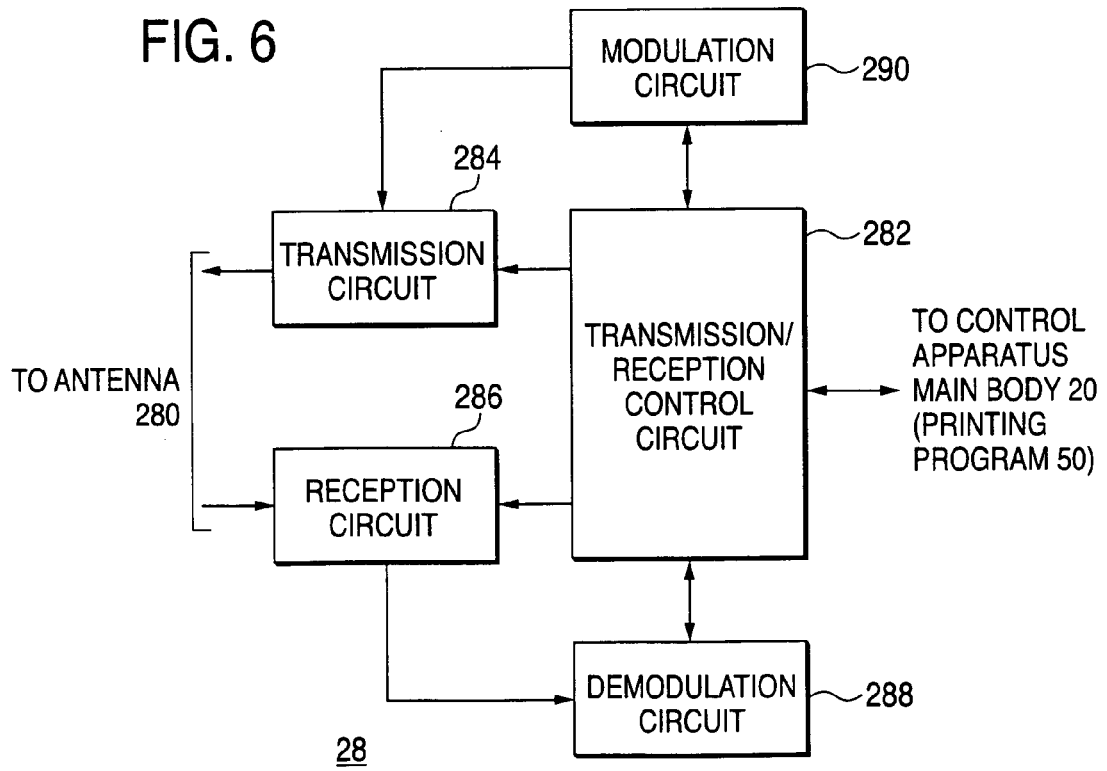
FIG. 6 is a diagram for indicating a structure of an IC chip IF shown in FIG. 2 and FIG. 3.

FIG. 6 is a diagram for schematically showing a structure of the first and second IC chip IF 28-1 and 28-2 shown in FIG. 2 and FIG. 3.

As shown in FIG. 5, the first IC chip 3 includes an antenna 300, a clock reproducing circuit 320, a memory circuit 322, a data transmitting/receiving circuit 324, and a power supply circuit 326.

It should also be noted that when it is so guaranteed that the IC chip 3 of the original paper 40 passes through an area in close proximity to the antenna 280, an IC chip 3 having no antenna 300 may be employed.

When there are a plurality sets of elements having essentially same structural such as the first IC chip IF 28-1 and the second IC chip IF 28-2 in the below-mentioned descriptions, these IC chip IF 28-1 and 28-2 will be abbreviated as a general-termed "IC chip IF 28" hereinafter.

Also, as shown in FIG. 6, the IC chip IF 28 includes a transmission circuit 284, a reception circuit 286, a transmission/reception control circuit 282, a demodulation circuit 288, and a modulation circuit 290.

In accordance with the below-mentioned operations of the respective constituent components employed in the IC chip 3 and the IC chip IF 28, information (data) is written into the IC chip 3 via the IC chip IF 28 in a non-contact manner, and the information (data), which has been stored in the IC chip 3, is read therefrom via the IC chip IF 28 in a non-contact manner.

In the IC chip 3 (see FIG. 5), the power supply circuit 326 rectifies an electromagnetic wave signal supplied via the antenna 300 so as to supply electric power to the respective constituent components of the IC chip 3, while this electric power is required for these constituent components.

The clock reproducing circuit 320 reproduces a clock signal from the electromagnetic wave signal supplied via the antenna 300 from the IC chip IF 28 to output this reproduced clock signal to the memory circuit 322 and the data transmitting/receiving circuit 324.

The memory circuit 322 is, for example, a nonvolatile RAM (random access memory). This memory circuit 322 stores thereinto data indicative of information which is input from the data transmitting/receiving circuit 322 in synchronization with the clock signal input from the clock reproducing circuit 320.

Also, the memory circuit 322 outputs data indicative of the information stored therein with respect to the data transmitting/receiving circuit 324 in synchronization with the clock signal.

To clarify and embody an explanation, in the first embodiment, it should be understood that the following case is assumed as a specific example. That is, in this specific example, a printing parameter (will be discussed later with reference to FIG. 8) capable of designating a printing method of an image has been stored in the memory circuit 322 at a stage that the IC chip 3 is attached to the original paper 40.

The data transmitting/receiving circuit 324 demodulates the electromagnetic wave signal input via the antenna 300 into data to output the demodulated data to the memory circuit 322 in synchronization with the clock signal input from the clock reproducing circuit 320.

Also, the data transmitting/receiving circuit 324 changes the reflection intensity of the electromagnetic wave signal supplied from the IC chip IF 28 in accordance with a value of the data input from the memory circuit 322 in synchronization with the clock signal.

As described above, the data indicative of the information, which has been stored in the memory circuit 322, is transmitted from the IC chip 3 to the IC chip IF 28 with changing the intensity of the reflection signal of the electromagnetic wave signal transmitted from the IC chip IF 28 to the IC chip 3.

In the IC chip IF 28 (FIG. 6), the transmission/reception control circuit 282 controls operations of the respective constituent components of this IC chip IF 28.

Also, this transmission/reception control circuit 282 outputs data input from the control apparatus main body 20 (namely, first printing program 50, which will be discussed later with reference to FIG. 7) to the demodulation circuit 288.

Further, this transmission/reception control circuit 282 outputs data, which has been received by the reception circuit 286 and then has been demodulated by the demodulation circuit 288, to the control apparatus main body 20.

The modulation circuit 290 modulates a high frequency signal (radio frequency signal) based upon data input from the transmission/reception control circuit 282 to produce an electromagnetic wave signal, and then, outputs this produced electromagnetic wave signal to the transmission circuit 284.

The transmission circuit 284 transmits the electromagnetic wave signal via the antenna 280 to the IC chip 3, while this electromagnetic wave signal contains data to be stored in the IC chip 3 and the clock signal.

The reception circuit 286 receives a reflection signal, which is reflected from the IC chip 3, to output this received reflection signal to the demodulation circuit 288.

The modulation circuit 288 demodulates a change of the reflection signal input from the reception circuit 286 into the data transmitted from the IC chip 3 to output the demodulated data to the transmission/reception control circuit 282.

[First Printing Program 50]

Figure 7:
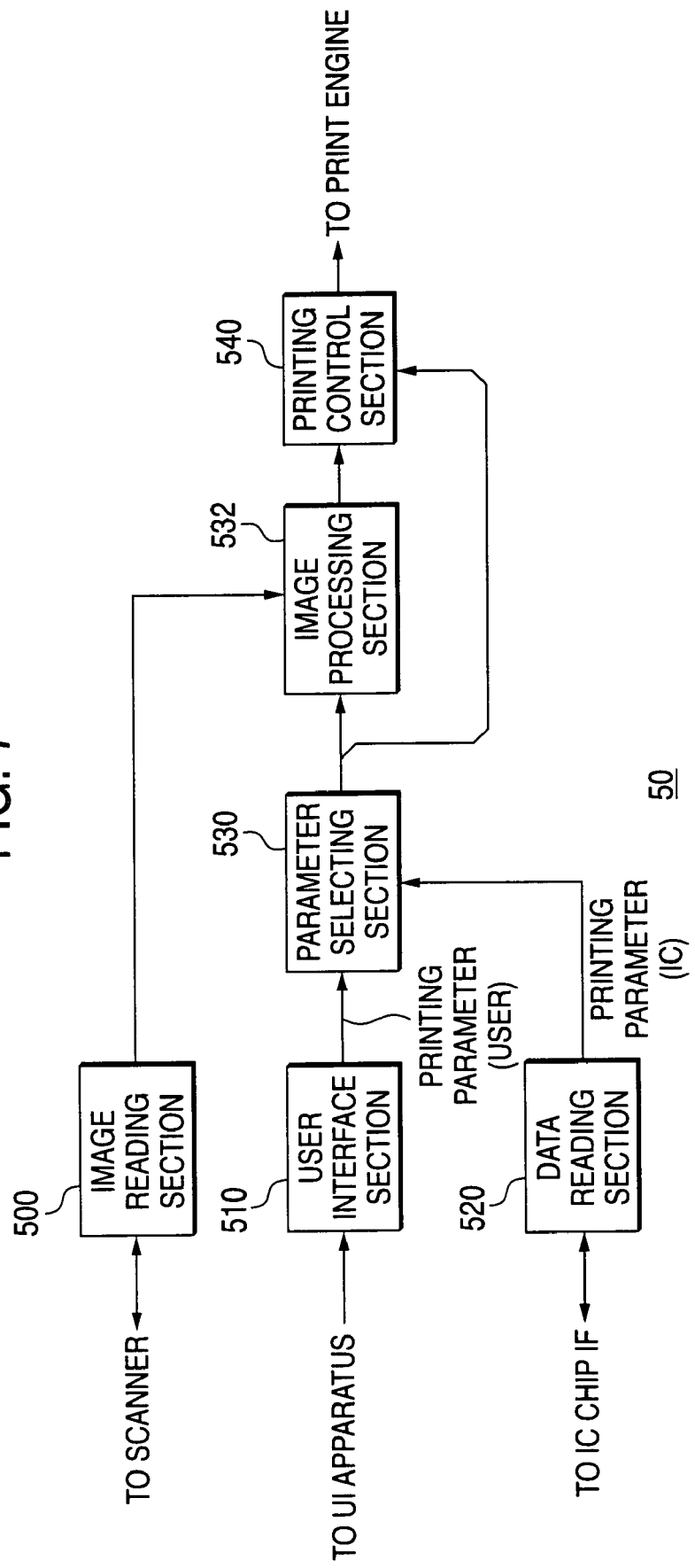
FIG. 7 is a diagram for representing a structure of a first printing program which is executed by the control apparatus (FIG. 2 and FIG. 3) so as to realize the image forming method according to the present invention.

FIG. 7 is a block diagram for schematically showing a structure of a first printing program 50, which is executed by the control apparatus 2 (see FIG. 2 and FIG. 3) so as to realize the image forming method according to the invention.

As shown in FIG. 7, the first printing program 50 includes an image reading section 500, a user interface (UI) section 510, a data reading section 520, a parameter selecting section 530, an image processing section 532, and a printing control section 540.

The first printing program 50 is supplied via, for example, a recording medium 240 (see FIG. 2) to the control apparatus 2, and is loaded to the memory 204 so as to be executed.

The first printing program 50 reads a printing parameter for designating a printing method, which has been stored in the IC chip 3 (FIG. 4 and FIG. 5) to print the image read from the original paper 40 on the printing paper 42 in accordance with the read printing parameter. The printing method includes a color copy/black/white copy, a total printing number, equi-magnification/enlargement/compression modes, and an N-up printing mode.

In the first printing program 50, the image reading section 500 controls the constituent components of the apparatus main body 10 such as the original feeding apparatus and the scanner 16 (see FIG. 3) in accordance with a control of the control apparatus main body 20 to read an image of the original paper 40 (FIG. 4).

The UI section 510 receives operation by a user with respect to the UI apparatus 26 (FIG. 2 and FIG. 3), and outputs a printing parameter (will be indicated as "printing parameter (user)"), which has been set by the user to the parameter selecting section 530.

FIG. 8 is a diagram for showing an example of data stored in the IC chip 3. As shown in FIG. 8, data such as a printing parameter (will be indicated as "printing parameter (IC)"), histories and error detection/correction codes thereof are stored in the IC chip 3 (FIG. 4 etc.).

The data reading section 520 controls the first IC chip IF 28-1 (FIG. 2 etc.) so as to read data, which has been stored in the memory circuit 322 (FIG. 5) of the IC chip 3 to output the read data to the parameter selecting section 530.

It should also be noted that a check as to whether or not the data derived from the IC chip 3 can be read properly and another check as to whether or not the IC chip 3 is attached to the original paper 40 may be made by employing the following method. That is, the data reading section 520 may check as to whether or not an error occurs in the read data using the error detection/correction code.

The parameter selecting section 530 (FIG. 7) selects either the printing parameter (IC) input from the data reading section 520 or the printing parameter (user) input from the UI section 510 in response to an operation of the user with respect to the UI section 510, and a check result as to whether or not the IC chip 3 is attached to the original paper 40. Then, this parameter selecting section 530 outputs the selected printing parameter (IC, or user) to the image processing section 532 and the printing control section 540.

In other words, for instance, in such a case that the parameter selecting section 530 can read the printing parameter (IC) from the IC chip 3 attached to the original paper 40 (FIG. 4 etc.) properly, the parameter selecting section 530 selects the printing parameter (IC) with user's agreement. In other cases, the parameter selecting section 530 selects the printing parameter (user) input from the UI section 510. Thereafter, the parameter selecting section 530 outputs the selected printing parameter to the image processing section 532 and the printing control section 540.

The image processing section 532 (FIG. 7) performs a process operation such as enlargement/compression and an N-up image with respect to the image of the original paper 40 (FIG. 4 etc.) input from the image reading section 500 in accordance with the printing parameter input from the parameter selecting section 530. Then, the image processing section 532 outputs the processed image to the printing control section 540.

In other words, for instance, in the case that the printing parameter designates the N-up printing operation with respect to the image input from the image reading section 500, the image processing section 532 performs the image processing operation for the N-up printing operation. Whereas, in the case that the printing parameter designates the enlarging/compressing operation, the image processing section 532 executes the enlarging/compressing process operation with respect to the image input from the image reading section 500.

The printing control section 540 (FIG. 7) controls the constituent components of the apparatus main body 10 such as the paper tray section 12 (FIG. 3) and the print engine 14 in accordance with a printing parameter input from the parameter selecting section 530 to print the processed image obtained by the image processing section 532.

In other words, for example, the printing control section 540 prints the processed image, which is input from the image processing section 532, in either the color print mode or the black/white print mode on the printing papers 42, the quantity of which is designated by the printing parameter, in response to this printing parameter.

[Overall Operation]

Next, overall operation of the composite copying machine 1 (first printing program 50) will be described.

Figure 9:
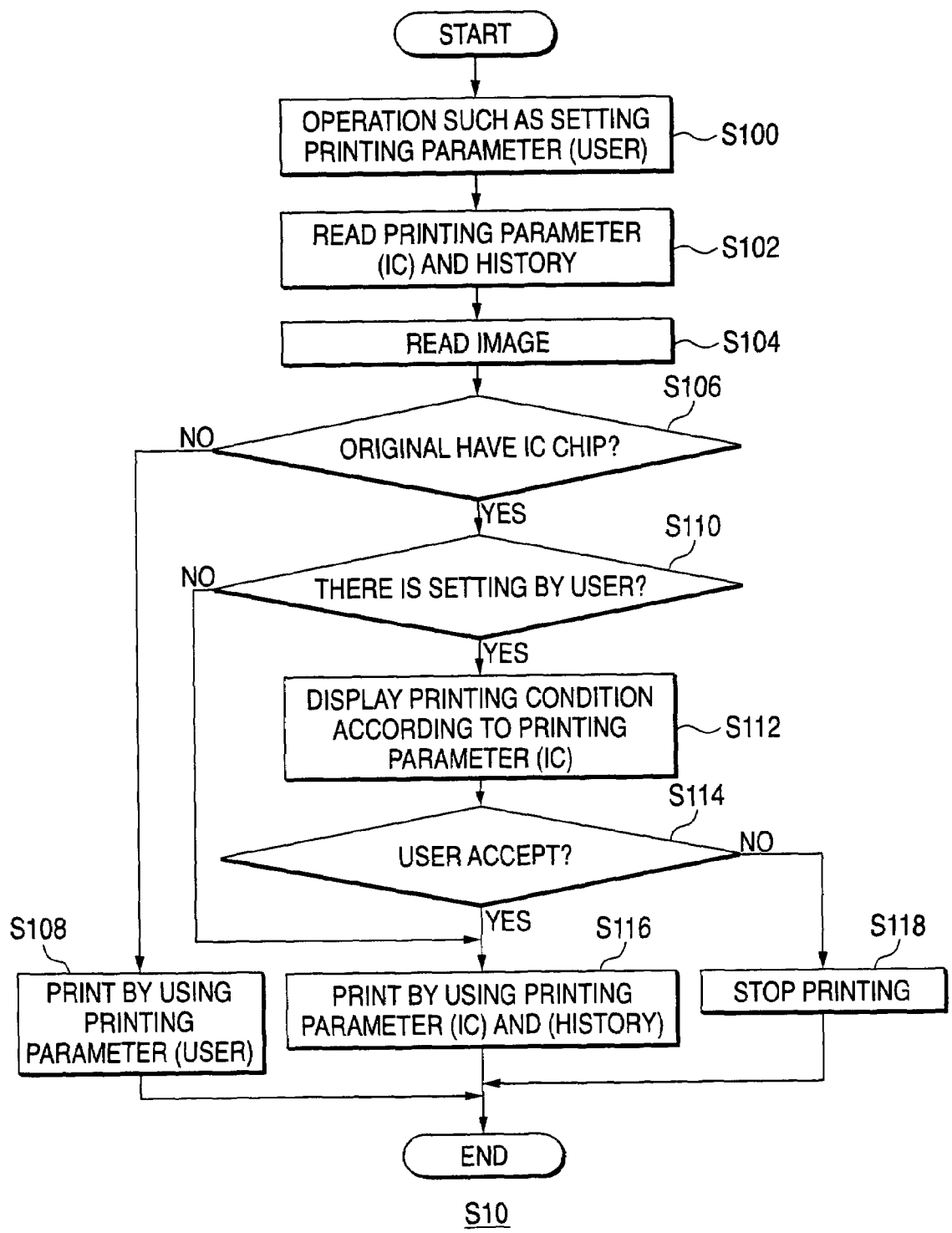
FIG. 9 is a flow chart for describing operations (S10) of the composite copying machine (first printing program FIG. 7) shown in FIG. 2 and FIG. 3.

FIG. 9 is a flow chart for describing an operation (S10) of the composite copying machine 1 (namely, first printing program 50; FIG. 7).

As shown in FIG. 9, in a step 100 (S100), the user executes only an operation for commencing a printing operation, or executes both an operation for setting a printing parameter and the operation for commencing the printing operation with respect to the UI apparatus 26 (FIG. 2 etc.).

When the UI section 510 (FIG. 7) receives the operation made by the user and the user sets the printing parameter, this UI section 510 outputs this printing parameter (printing parameter (user)) to the parameter selecting section 530.

In a step 102 (S102), the data reading section 520 controls the first IC chip IF 28-1 (FIG. 2 and FIG. 3) so as to read a printing parameter (printing parameter (IC)) from the original paper 40 (FIG. 4 etc.) transported through the original paper transport path 102.

In a step 104 (S104), the image reading section 500 controls the scanner 16 (FIG. 3) to read an image from the original paper 40 (FIG. 4 etc.) transported via the original paper transport path 102.

In a step 106 (S106), the parameter selecting section 530 (FIG. 7) judges as to whether or not the IC chip 3 is attached to the original paper 40 (FIG. 4 etc.).

When the IC chip 3 is attached to the original paper 40, the first printing program 50 is advanced to a process in a step S110, whereas in other cases, the first printing program 50 is advanced to another process in a step S108.

In the step 108 (S108), the parameter selecting section 530 (FIG. 7) outputs the printing parameter (user) input from the UI section 510 to both the image processing section 532 and the printing control section 540.

In such a case that the user does not clearly set the printing parameter in the above-described process operation of the step S100, the parameter selecting section 530 outputs a printing parameter, which has been set as a default value, to both the printing process unit 532 and the printing control section 540.

The image processing section 532 and the printing control section 540 perform a printing operation with respect to the printing paper 42 (FIG. 2 etc.) in accordance with the printing parameter (user) input from the parameter selecting section 530.

In a step 110 (S110), the parameter selecting section 530 (FIG. 7) judges as to whether or not there is a printing parameter (user), which has been set by the user in the process of the step S100.

When there is the printing parameter (user), which has been set by the user, the first printing program 50 is advanced to a process in a step S112, whereas in other cases, the first printing program 50 is advanced to another process in a step S116.

In the step 112 (S112), the UI section 510 (FIG. 7) displays on the UI apparatus 26 (FIG. 3) a message that a printing operation is carried out in accordance with not the printing parameter (user) set by the user, but the printing parameter (IC) read from the IC chip 3.

In a step 114 (S114), the UI section 510 judges as to whether or not the user executes an operation indicating that the user agrees to the printing operation according to the printing parameter (IC) read from the IC chip 3.

When the user's agreement operation is carried out, the first printing program 50 is advanced to a process in a step S116, whereas in other cases, the first printing program 50 is advanced to another process in a step S118.

In the step 116 (S116), the parameter selecting section 530 (FIG. 7) outputs the printing parameter (IC) read from the IC chip 3 (FIG. 4 etc.) to both the image processing section 532 and the printing control section 540.

The image processing section 532 and the printing control section 540 execute the printing operation with respect to the printing paper 42 (FIG. 2 etc.) in accordance with the printing parameter (IC) input from the parameter selecting section 530.

In the step 118 (S118), the first printing program 50 stops the printing operation.

[Modification]

Figure 10:
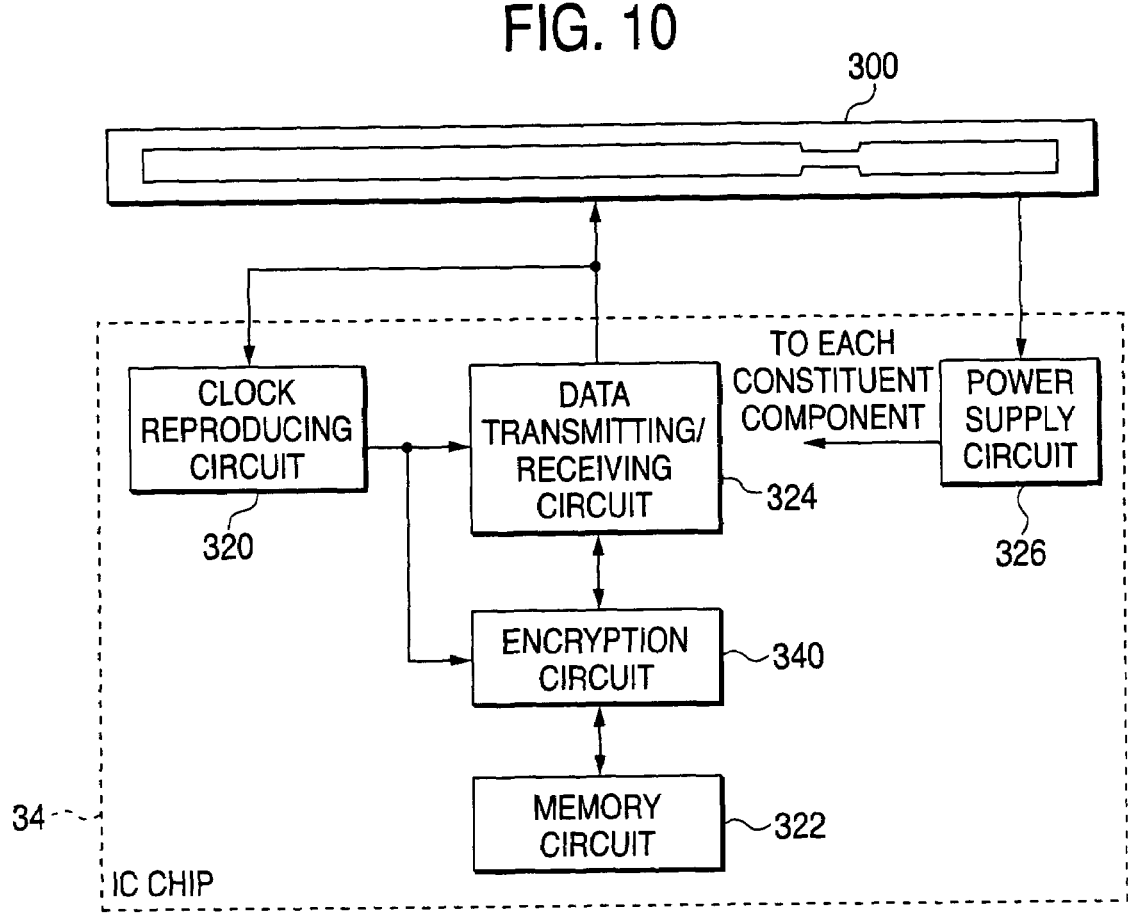
FIG. 10 is a diagram for exemplifying a structure of a second IC chip.

FIG. 10 is a diagram for showing an example of a structure of a second IC chip 34.

Figure 11:
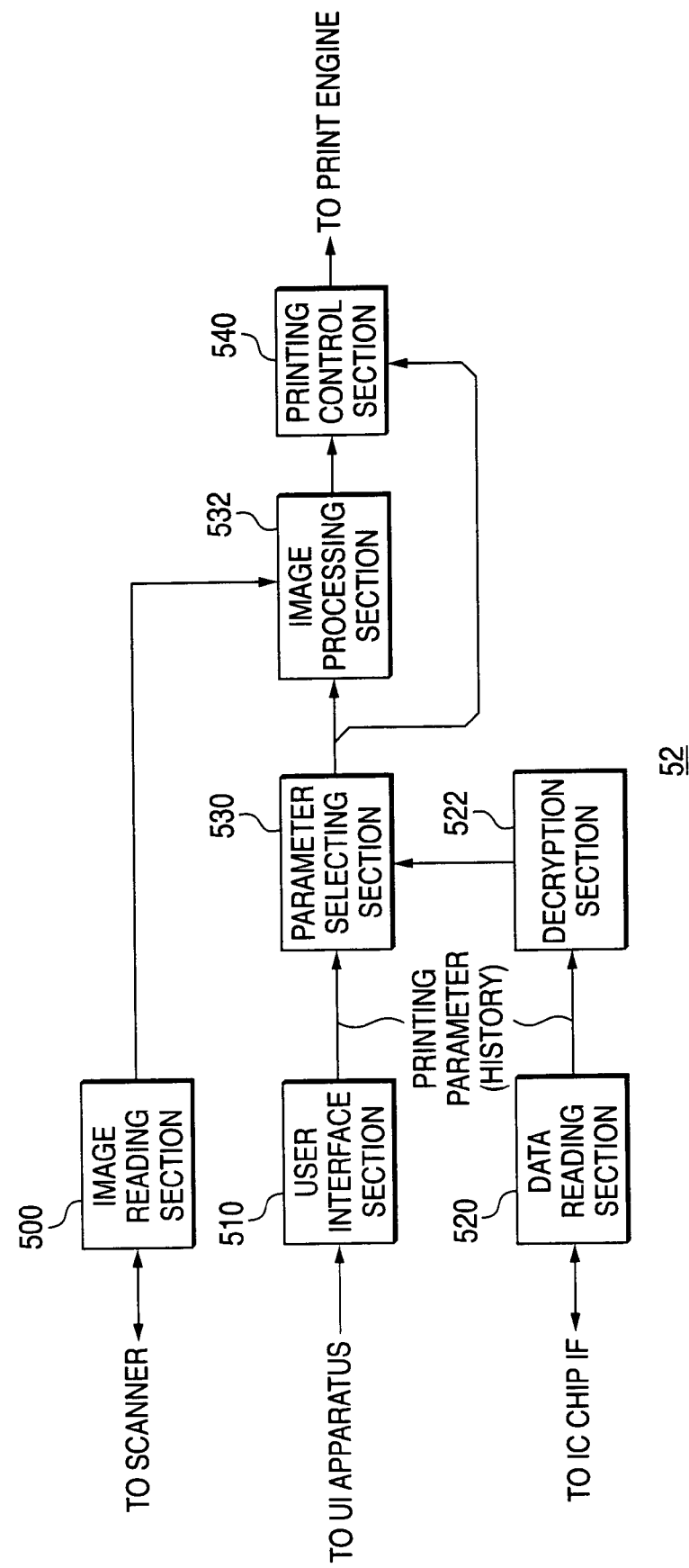
FIG. 11 is a diagram for representing a structure of a second printing program.

FIG. 11 is a block diagram for showing a structure of a second printing program 52.

As shown in FIG. 10, the second IC chip 34 employs such a structure that an encryption circuit 340 is additionally interposed between the memory circuit 322 and the data transmitting/receiving circuit 324 of the first IC chip 3 (see FIG. 5).

As shown in FIG. 11, the second printing program 52 employs such an arrangement that a decryption section 522 is additionally interposed between the data reading section 520 and the parameter selection unit 530 of the first printing program 50.

It should be understood that the same reference numerals used in the respective structural components of the first IC chip 3 will be employed as those for denoting the essentially same structural components of this second IC chip 34. Furthermore, the same reference numerals used in the respective structural components of the first printing program 50 will be employed as those for denoting the essentially same structural components of the second printing program 52.

In such a case that the first IC chip 3 includes the encryption circuit 340 and the second printing program 52 includes the decryption section 522, in the second IC chip 34, the encryption circuit 340 reads a printing parameter from the memory circuit 322 in synchronization with the clock signal, and then encrypts this read printing parameter to output the encrypted printing parameter to the data transmitting/receiving circuit 324.

The data (printing parameter), which has been encrypted and output, is decrypted by the decryption section 522 in the second printing program 52, and thereafter, the decrypted data is processed in the process operation shown in FIG. 9.

As described above, it is preferable to execute such an operation that while the data is encrypted in the second IC chip 34, the encrypted data is decrypted in the second printing program 52 in order to improve secrecy of information.

Second Embodiment

Next, a description will now be made of a second embodiment according to the present invention.

In an image forming method indicated as the second embodiment, both a printing parameter, which is read out from an IC chip attached to an original paper, and a history of printing operations are written in another IC chip attached to a printing paper.

Further, such a history indicating how an image of the original paper has been so far printed (for instance, conditions of N-up printing operation shown in FIG. 1A to FIG. 1D) is written in the IC chip attached to the original paper, and thus, this written history may be employed in a printing operation.

[Third Printing Program 54]

Figure 12:
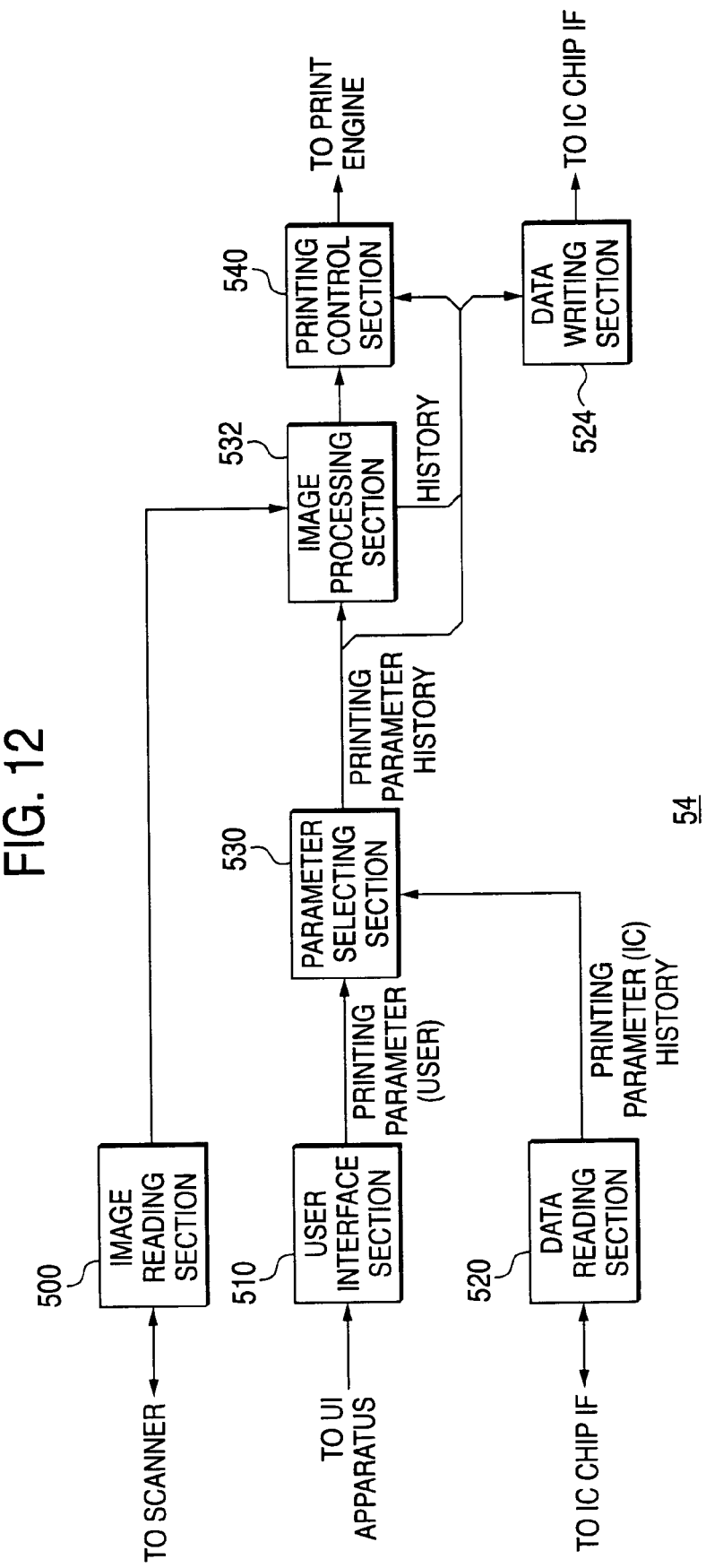
FIG. 12 is a diagram for indicating a structure of a third printing program which is executed by the control apparatus (FIG. 2, FIG. 3) so as to realize an image forming method according to the present invention instead of the first printing program shown in FIG. 7.

FIG. 12 is a block diagram for showing a structure of a third printing program 54 capable of realizing the image forming method of the invention, which is executed by the control apparatus 2 (FIG. 2 and FIG. 3), instead of the first printing program 50 shown in FIG. 7.

Figure 13A:
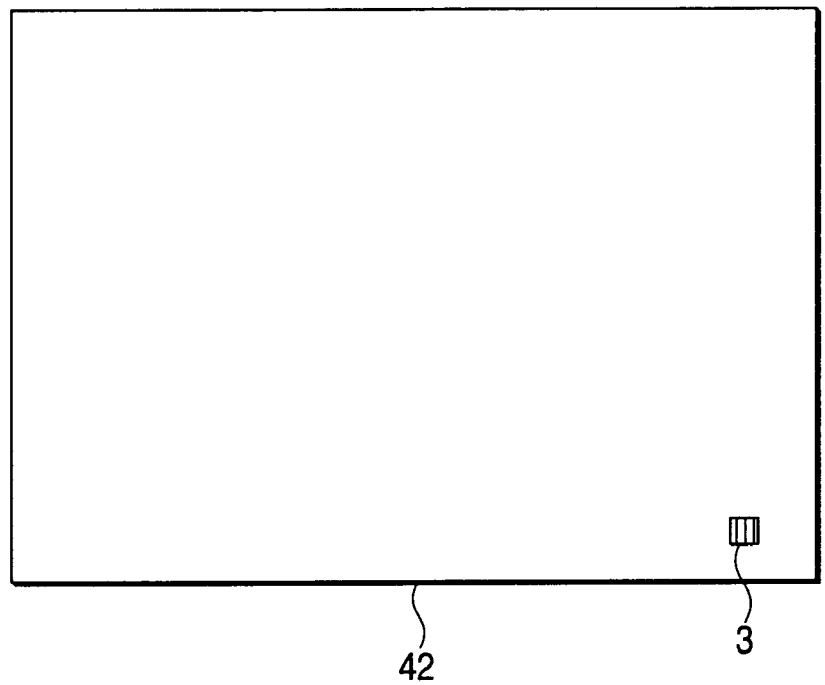
FIG. 13A is a diagram for showing a printing paper before an image is printed out.
Figure 13B:
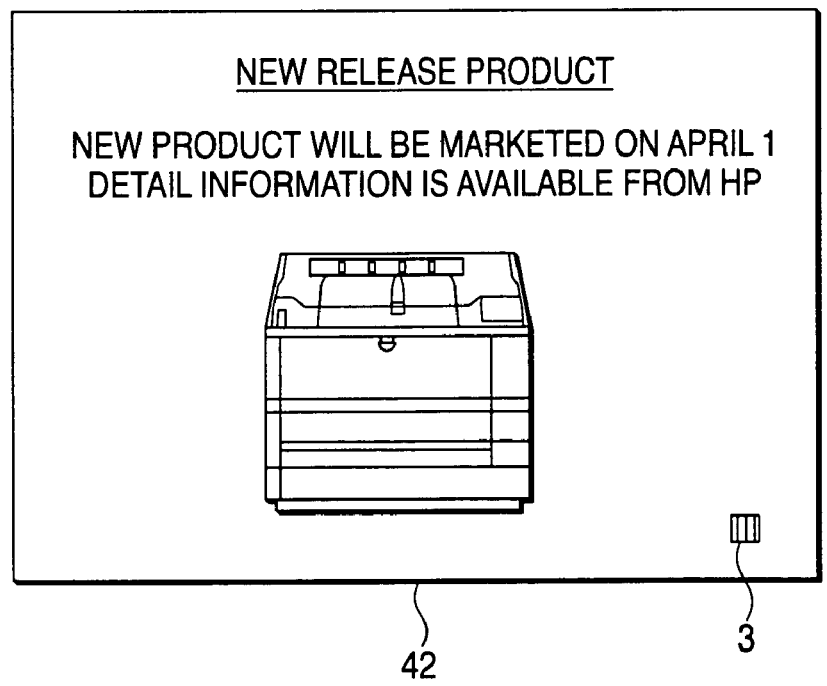
FIG. 13B is a diagram for representing a printing paper after the image is printed out.

FIG. 13 is a diagram for showing a printing paper 42 to which the first IC chip 3 has been attached. FIG. 13A shows the printing paper 42 before an image is printed thereon, and FIG. 13B shows the printing paper 42 after the image has been printed thereon.

It should be understood that the same reference numerals are used for the respective constituent components as those for respective constituent components of both the first printing program 50 and the second printing program 52 to denote the essentially same structural components of the third printing program 54.

In the second embodiment, as indicated by using parentheses in FIG. 8, a history of printing operations is additionally written into the first IC chip 3 (FIG. 4 etc.) attached to the original paper 40.

As shown in FIG. 12, the third printing program 54 employs such a structure that a data writing section 524 is additionally provided in the first printing program 50.

In the third printing program 54, the data reading section 520 reads the printing parameter (IC) from the first IC chip 3 attached to the original paper 40 in addition to the history, and then, outputs these read printing parameter (IC) and history to the parameter selecting section 530.

Also, the parameter selecting section 530 selects one of the printing parameter (user), which is input from the UI section 510, the printing parameter (IC) and the history, which are input from the data reading section 520 (there may be a case where only the printing parameter (IC) is stored in the first IC chip 3), and then, outputs the selected one to both the image processing section 532 and the printing control section 540.

Also, the parameter selecting section 530 outputs the one of the printing parameter (user) and the printing parameter (IC) to the data writing section 524.

Similar to the first embodiment, both the image processing section 532 and the printing control section 540 perform a printing operation in accordance with the printing parameter input from the parameter selecting section 530, and furthermore execute a printing operation in accordance with the history input from the parameter selecting section 530, if input.

In other words, for instance, when the history read from the first IC chip 3 indicates that the image of the original paper 40 has been printed in the equi-magnification printing mode, both the image processing section 532 and the printing control section 540 perform the printing operation in one of the equi-magnification printing mode, the 2-up printing mode, the 4-up printing mode (see FIG. 1A to FIG. 1), and the compression printing mode in response to an instruction by the user.

Also, for instance, when the history read from the first IC chip 3 indicates that an image of an original paper 40 has been printed in the 2-up printing mode, both the image processing section 532 and the printing control section 540 perform the printing operation only in either the equi-magnification printing mode or the 2-up printing mode in accordance with an instruction by the user, and also prohibit that the printing operation is carried out in both the 4-up printing operation and the compression printing operation, which may cause such a possibility that printed images of the original paper 40 cannot be read/discriminated.

Also, for instance, when the history read from the first IC chip 3 indicates that an image of an original paper 40 has been printed in the 2-up printing mode, both the image processing section 532 and the printing control section 540 perform a printing operation only in either the equi-magnification printing mode or the 2-up printing mode in accordance with an instruction by the user, and also prohibit that the printing operation is carried out in the 4-up printing operation, which may cause such a possibility that printed images of the original paper 40 cannot be read/discriminated.

Also, similarly, both the image processing section 532 and the printing control section 540 prohibit that a printing operation is carried out in the compressed-magnification mode, which may cause such a possibility that printed images of the original paper 40 cannot be read/discriminated.

Also, for instance, when the history read from the first IC chip 3 indicates that an image of an original paper 40 has been printed in the 4-up printing mode, both the image processing section 532 and the printing control section 540 perform the printing operation only in either the equi-magnification printing mode or the 2-up printing mode in accordance with an instruction by the user.

Furthermore, when the image processing section 532 prints an image on the printing paper 42, this image processing section 532 outputs information indicating that the printing operation has been carried out for the image in the N-up processing operation, the enlarging process operation, or the compressing process operation as a new history to the data writing section 524.

The data writing section 524 controls the second IC chip IF 28-2 (FIG. 2 and FIG. 3) to store both the printing parameter input from the parameter selecting section 530 and the history input from the image processing section 532 into the first IC chip 3 attached to the printing paper 42, as indicated in FIG. 13A and FIG. 13B.

[Overall Operation]

Next, a description is made of overall operation of the composite copying machine 1 (namely, third printing program 54 shown in FIG. 12) according to the second embodiment.

FIG. 14 is a flow chart for describing the overall operation (defined in step S12) of the composite copying machine 1 according to the second embodiment.

As shown in FIG. 14, the third printing program 54 executes a process operation similar to the process operation in the step S10 shown in FIG. 9 in accordance with either the printing parameter (user) set by the user or the printing parameter (IC) and the history, which are read from the IC chip 3 (FIG. 4 etc. to obtain a print result (see FIG. 13B).

After the process operation defined in either the step S108 or the step S116 (FIG. 9) has been carried out, the third printing program 54 (FIG. 12) is advanced to a process in a step S120 of FIG. 14.

In the step 120 (S120), the data reading section 520 controls the second IC chip IF 28-2 in order to read data from the first IC chip 3 attached to the printing paper 42 (FIG. 13B) in synchronization with detecting the first IC chip 3 attached to the printing paper 42, which is transported through the printing paper transport path 100.

In a step 122 (S122), the data reading section 520 judges as to whether or not the first IC chip 3 (see FIG. 13B) is attached to the printing paper 42.

The third printing program 54 is advanced to a process in a step S124 when the IC chip 3 is attached to the printing paper 42, whereas the process operation of this printing program 54 is terminated in other cases.

In a step 124 (S124), the data writing section 524 controls the second IC chip IF 28-2 (FIG. 2 and FIG. 3) in order that the printing parameter input from the parameter selecting section 530 and the history input from the image processing section 532 are written into the first IC chip 3 attached to the printing paper 42 which is fed through the printing paper transport path 100 (FIG. 3). It should be noted that the data writing section 524 may control the second IF chip IF 28-2 to write one of printing parameter and the history into the first IC chip 3.

As previously described, in accordance with the image forming system and the image forming method of the present invention, while utilizing the semiconductor chip from which the data stored thereinto can be read in the non-contact manner, the setting information of the image formation is stored in the original paper, and the image formation can be carried out by employing the stored setting information of the image formation.

Also, in accordance with the image forming system and the image forming method of the invention, while both the setting information of the image formation and the history are stored, when the image, which has been formed on the printing paper, is used to be furthermore formed, both the setting information and the history can be utilized.

What is claimed is:

1. An image forming system comprising:
   an image display member on which an image is displayed; and
   an image forming apparatus, wherein:
   the image display member includes:
   a first parameter storage unit that stores a first parameter indicating a way to form the displayed image and a formation history of the displayed image and outputs the stored first parameter to an external unit;
   the image forming apparatus includes:
   an image reading unit for reading the displayed image;

a parameter reading unit for reading the output first parameter; and an image forming unit for forming the read image on the basis of the read first parameter on a recording medium; and a parameter writing unit for writing the read first parameter and a second parameter containing a history updated in response to the image formation on the recording medium into a second parameter storage unit included in the recording medium, wherein the history contained in the second parameter includes information indicating a previous printing of the image formed on the recording medium in an n-up print mode and information indicating the value of n, where n is a positive integer.

2. The image forming system according to claim 1, wherein:

the second parameter storage unit stores the first parameter written from the external unit and outputs the stored first parameter to the external unit.

3. An image forming apparatus comprising:

an image reading unit for reading an image displayed on an image display member;

a parameter reading unit for reading a first parameter indicating at least one of a way to form the displayed image and a formation history of the displayed image from the image display member;

an image forming unit for forming the read image on the basis of the read first parameter on a recording medium; and a parameter writing unit for writing the read first parameter and a second parameter containing a history updated in response to the image formation on the recording medium into a storage unit of the recording medium, wherein the history contained in the second parameter includes information indicating a previous printing of the image formed on the recording medium in an n-up print mode and information indicating the value of n, where n is a positive integer.

4. The image forming apparatus according to claim 3, wherein the first parameter includes information indicating a mode for forming the displayed image on the recording medium, a size of the formed image, and a number of the image formation.

5. A method for forming an image, which is displayed on an image display member, on a recording medium, the method comprising:

outputting a first parameter indicating at least one of a way to form the displayed image and a formation history of the displayed image to an external unit by the image display member;

reading the displayed image from the image display member;

reading the output first parameter;

forming the read image on the basis of the read first parameter on a recording medium; and writing the read first parameter and a second parameter containing a history updated in response to the image formation on the recording medium into the recording medium, wherein the history contained in the second parameter includes information indicating a previous printing of the image formed on the recording medium in an n-up print mode and information indicating the value of n, where n is a positive integer.

6. The method according to claim 5, further comprising:

storing a parameter written from the external unit and outputting the stored parameter to the external unit by the recording medium.

7. A computer program encoded in a computer-readable medium when executed by the computer comprising:

outputting a first parameter indicating at least one of a way to form an image, which is displayed on a image display member, and a formation history of the displayed image to an external unit by the image display member;

reading the displayed image from the image display member;

reading the output first parameter;

forming the read image on the basis of the read first parameter on a recording medium;

writing the read first parameter and a second parameter containing a history updated in response to the image formation on the recording medium into the recording medium, wherein the history contained in the second parameter includes information indicating a previous printing of the image formed on the recording medium in an n-up print mode and information indicating the value of n, where n is a positive integer.

8. The program according to claim 7, wherein the program further comprises:

storing a parameter written from the external unit and outputting the stored parameter to the external unit by the recording medium.

* * * * *